United States Patent
Pugh (12) United States Patent (10) Patent No.: US 6,389,744 B1
(45) Date of Patent: *May 21, 2002

(54) SUPPORT FOR ARTICLES HAVING AN ELONGATED PORTION

(76) Inventor: Jerry Thomas Pugh, 435 Rhone Ct., Mountain View, CA (US) 94043

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,098

(22) Filed: Jan. 4, 1997

(51) Int. Cl.$^7$ ............................................. A01G 17/14
(52) U.S. Cl. ..................... 47/47; 248/27.8; 248/156; 248/175; 211/181.1
(58) Field of Search ............................ 47/44, 47, 41.01, 47/41.13; 248/156, 175, 27.8; 211/181.1

(56) References Cited

U.S. PATENT DOCUMENTS

| | | | |
|---|---|---|---|
| 456,175 A | 7/1891 | Van Orman | |
| 566,330 A | 8/1896 | Marsden | |
| 603,754 A | 5/1898 | Baldwin | |
| 687,283 A | 11/1901 | Springer et al. | |
| 760,879 A | 5/1904 | Kunzman | |
| 933,142 A | 9/1909 | Vogt | |
| 1,033,583 A | * 7/1912 | Hart | 47/41.13 |
| 1,223,043 A | 4/1917 | Draper | |
| 1,491,926 A | 4/1924 | Rosenwald | |
| 1,517,432 A | * 12/1924 | Kayte | |
| 1,699,935 A | * 1/1929 | Warnes | |
| 1,775,203 A | 9/1930 | Krumholz | |
| 1,860,405 A | * 5/1932 | Cheesewright | 47/41.13 |
| 2,003,101 A | 5/1935 | Asman | 47/41 |
| 2,173,217 A | 9/1939 | Thomsen | 47/47 |
| 2,193,727 A | 3/1940 | Jouffray | 120/108 |
| 2,229,527 A | 1/1941 | Schouman | 47/47 |
| 2,273,368 A | * 2/1942 | Mumford | 47/41.13 |
| 2,929,171 A | 3/1960 | Josephson | 47/41 |
| 2,929,511 A | 3/1960 | Josephson | 211/60 |
| 3,087,280 A | * 4/1963 | Seliger | 47/41.13 |
| 3,447,262 A | 6/1969 | Uhl | 47/41.11 |
| 3,470,651 A | 10/1969 | Simmon | 47/45 |
| 3,778,929 A | 12/1973 | Pearson | 47/58 |
| 4,094,096 A | * 6/1978 | Huyssen | 47/41.13 |
| 4,331,721 A | * 5/1982 | Ayers | 248/175 |
| D281,910 S | 12/1985 | Dinnebier et al. | D262/11 |
| 5,347,752 A | 9/1994 | Black | 47/41.11 |
| 5,477,637 A | 12/1995 | Aldrich | 47/41.01 |

FOREIGN PATENT DOCUMENTS

| | | | | |
|---|---|---|---|---|
| DE | 56002 | * 10/1912 | | 47/47 |
| DK | 43824 | * 3/1931 | | 47/47 |
| FR | 2492219 | * 4/1982 | | 47/47 |
| GB | 14700 | * 7/1899 | | 47/47 |
| GB | 212755 | * 3/1924 | | 47/47 |
| GB | 233075 | * 5/1925 | | 47/41.13 |

* cited by examiner

Primary Examiner—Peter M. Poon
Assistant Examiner—Joanne C. Downs (57) ABSTRACT

A support for articles having an elongated portion has a single shaft and a head made of wire. The head is attached to one end of the shaft. The head consists of a single wire formed into loops. The loops are formed at an angle with the shaft. The form of the support can resemble a flower, with the shaft representing the flower stem, the head representing the flower head and the loops representing the shape and arrangement of the flower petals. The support can be made from a single piece of wire. The invention can be used to support plant stems, arrange cut flowers in a bouquet or store writing implements.

14 Claims, 8 Drawing Sheets

SUPPORT FOR ARTICLES HAVING AN ELONGATED PORTION

BACKGROUND

This invention relates to a support for articles having an elongated portion. More specifically, this invention relates to such a support made from wire. This invention can be used, for example, for supporting the stems of living plants, for arranging cut flowers in a bouquet or for storing writing implements.

In the field of plant husbandry, it is useful to provide support for the stems of plants in order to protect them from potential damage from the elements like wind and rain. Further, in some cases, it is useful to provide support for a number of stems and, at the same time, keep the individual stems separated. There are a number of examples of plant supports in the field which serve this purpose. For example, the Grow-Thru Plant Support manufactured by Woodstock Wire Works, Inc. Woodstock, Ill. may be used to support long stemmed flowers like delphiniums, peonies, foxgloves, veronicas, stocks and carnations. The Grow-Thru support incorporates a horizontal wire grid feature that contains a plurality of openings. The flower stems grow through, are supported by and are held separated by this wire grid. The grid is formed from several pieces of wire welded together.

Use of a wire grid to support a number of articles has also been shown in other fields. For example, Rosenwald (U.S. Pat. No. 1,491,926) describes a support for cut flowers which includes a similar wire mesh support to facilitate the arrangement of the cut flowers in making a bouquet. In another example, Jouffray (U.S. Pat. No. 2,193,727) describes a support for storing writing implements which includes a feature made from a wire mesh.

Most such supports made from wire, like those referred to above, are composed of a number of wires. It would be a simplification to make such a support from a single piece of wire. However, prior supports intended for supporting a number of articles and made from a single wire do not surround and separate the individual articles being supported. As a result, they do not provide support in all lateral directions. For example, Thomsen (U.S. Pat. No. 2,173,217) describes a plant support with a supporting feature made from a single piece of wire wound into a spiral. Asman (U.S. Pat. No. 2,003,101) describes a flower holder with a supporting feature made from a single piece of wire bent into a serpentine. Krumholz (U.S. Pat. No. 1,775,203) describes a flower support with a support feature made from a single wire formed into a substantially circular head with indentations extending inward toward the center.

Some supports have been described which incorporate a wire formed in a series of closed loops that do surround and separate the individual articles being supported. However, these designs do not take advantage of the surprising increase in rigidity resulting from the looped wire construction in order to minimize the number of components. For example, rather than a simple design employing a single central shaft to support the looped wire form, they employ several supporting members.

For example, Vogt (U.S. Pat. No. 933,142) describes a flower stand or rack which incorporates a looped wire form but includes seven supporting members. In another example, Orman (U.S. Pat. No. 456,175) describes an umbrella holder which incorporates a looped wire form but has at least 4 supporting members.

Finally, it would also be advantageous to make such a support that was ornamental in design. A support that was ornamental as well as functional would be of more value to the user. However, attempts to make ornamental wire supports have resulted in complicated designs made from several pieces of wire. For example, the Sunflower Trellis available from Vision Sales, Inc., Bloomingdale, Ill. is constructed from several pieces of formed wire welded together to form an ornamental design. In another example, Baldwin (U.S. Pat. No. 603,754) shows an ornamental trellis that is formed by twisting several pieces of wire together.

OBJECT AND ADVANTAGES

Accordingly, several objects and advantages of the present invention are, (1) to provide a support for multiple articles having elongated portions, (2) to incorporate a positive article supporting feature which completely surrounds and keeps separated the individual articles being supported, (3) to take advantage of the surprising increase in rigidity afforded to a wire shape when formed into a series of closed loops in order to minimize the number of components, (4) to provide a support for elongated articles that is ornamental in design.

Still further objects and advantages will become apparent from a consideration of the ensuing description and drawings.

SUMMARY OF THE INVENTION

In accordance with the present invention, a device for restraining one or more articles that have an elongated portion includes a single elongated shaft having at a first end a head comprising a single wire bent in a substantially cycloid fashion to form a plurality of closed loops for restraining the articles. When I refer to the shaft having a head at a first end in this specification and the appended claims, it is to be understood that the head may in fact be near the end of the shaft. The term cycloid used here and in the appended claims refers to a progression of curved patterns.

LIST OF REFERENCE NUMERALS

20 Head
22 Shaft

24 Loop
26 Overlap of wire at base of loop
28 Overlap of wire of different loops
30 Opening
32 Plant stem
33 Weld
34 Head extension
38 Base
40 Cavity
42 Writing implement
44 Upper base loop
46 Lower base loop
48 Container
50 Cut flower

DETAILED DESCRIPTION OF INVENTION

Figure 1:
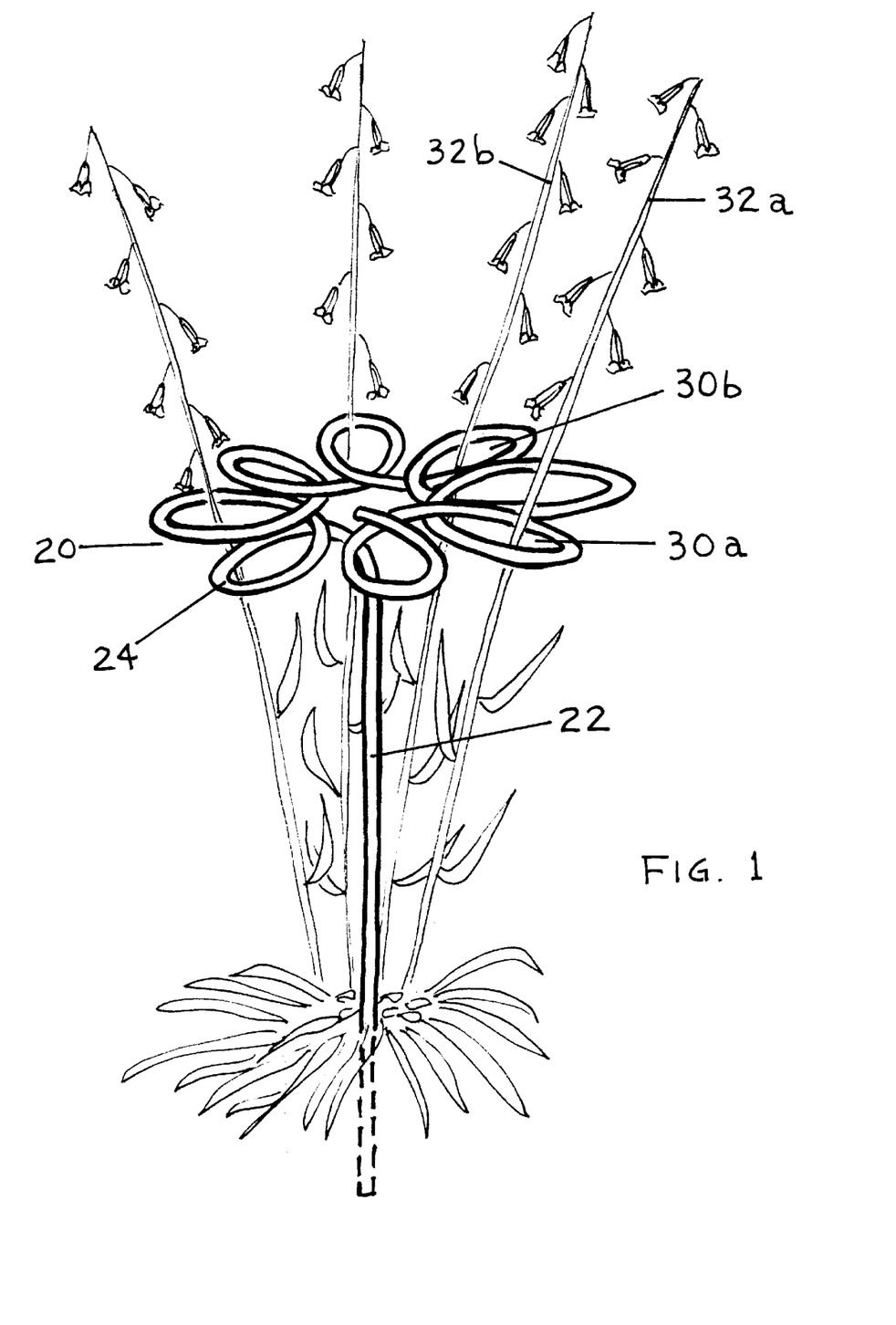
FIG. 1 is a perspective view of a plant support with the head formed in the shape of a daisy.
Figure 2:
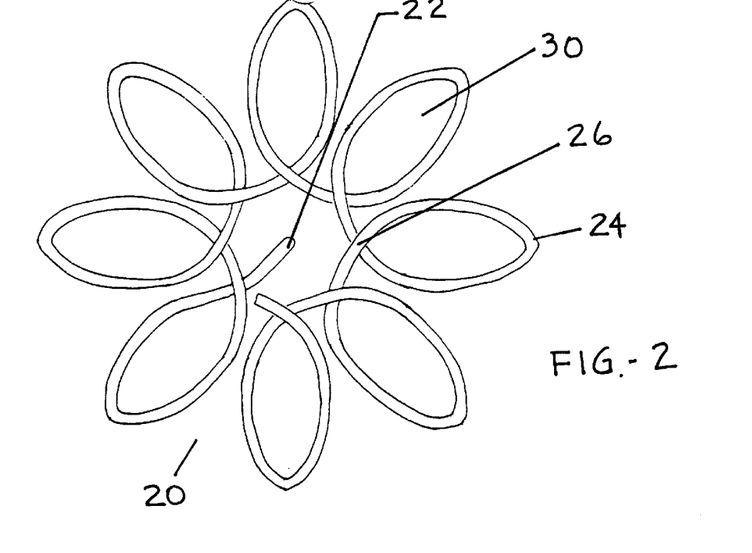
FIG. 2 is a top view of the embodiment shown in FIG. 1.

One embodiment of the support of this invention is illustrated in FIG. 1 (perspective view) and FIG. 2 (top view). This embodiment is a plant support consisting of a head 20 and a shaft 22. In this embodiment, the head 20 and shaft 22 are formed from a single piece of wire. The head 20 is essentially horizontal, the shaft 22 extends vertically downward and the shaft 22 is supported by means of inserting its lower end into the soil at the base of the plant. Referring to FIG. 2, the head 20 is comprised of a number of closed loops 24. Each loop 24 is closed by an overlap 26. The locus of overlaps 26 forms a generally circular pattern. Each loop 24 encloses an opening 30. Each loop 24 is elongated and extends radially outward from its overlap 26.

Referring to FIG. 1 showing the plant support in use, each opening 30 can provide support for one or more plant stems 32. Different openings 30a and 30b can support different plant stems 32a and 32b and at the same time keep the stems 32a and 32b separated from each other. Another result of forming the support as shown in this embodiment is that it resembles the appearance of a daisy, where the shaft 22 resembles the flower stem, the head 20 resembles a flower head while the loops 24 resemble the shape and arrangement of flower petals.

Figure 3:
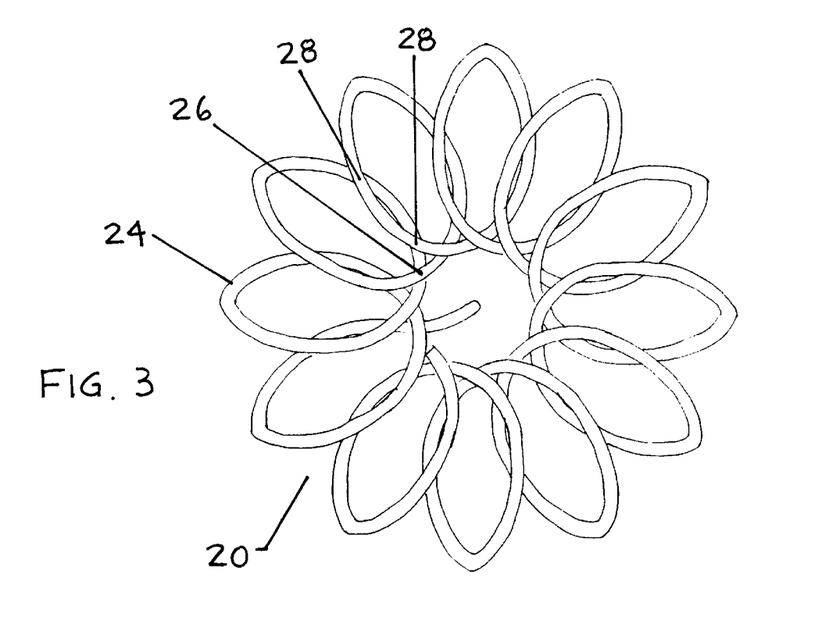
FIG. 3 is a top view of an alternate embodiment showing the head formed with overlapping loops.

An alternate embodiment of the plant support is shown in FIG. 3 (top view). This embodiment incorporates an alternate configuration of the head 20. In addition to overlap 26 at the base of each loop 24, there exist overlaps 28 between adjoining loops.

Figures 4, 5:
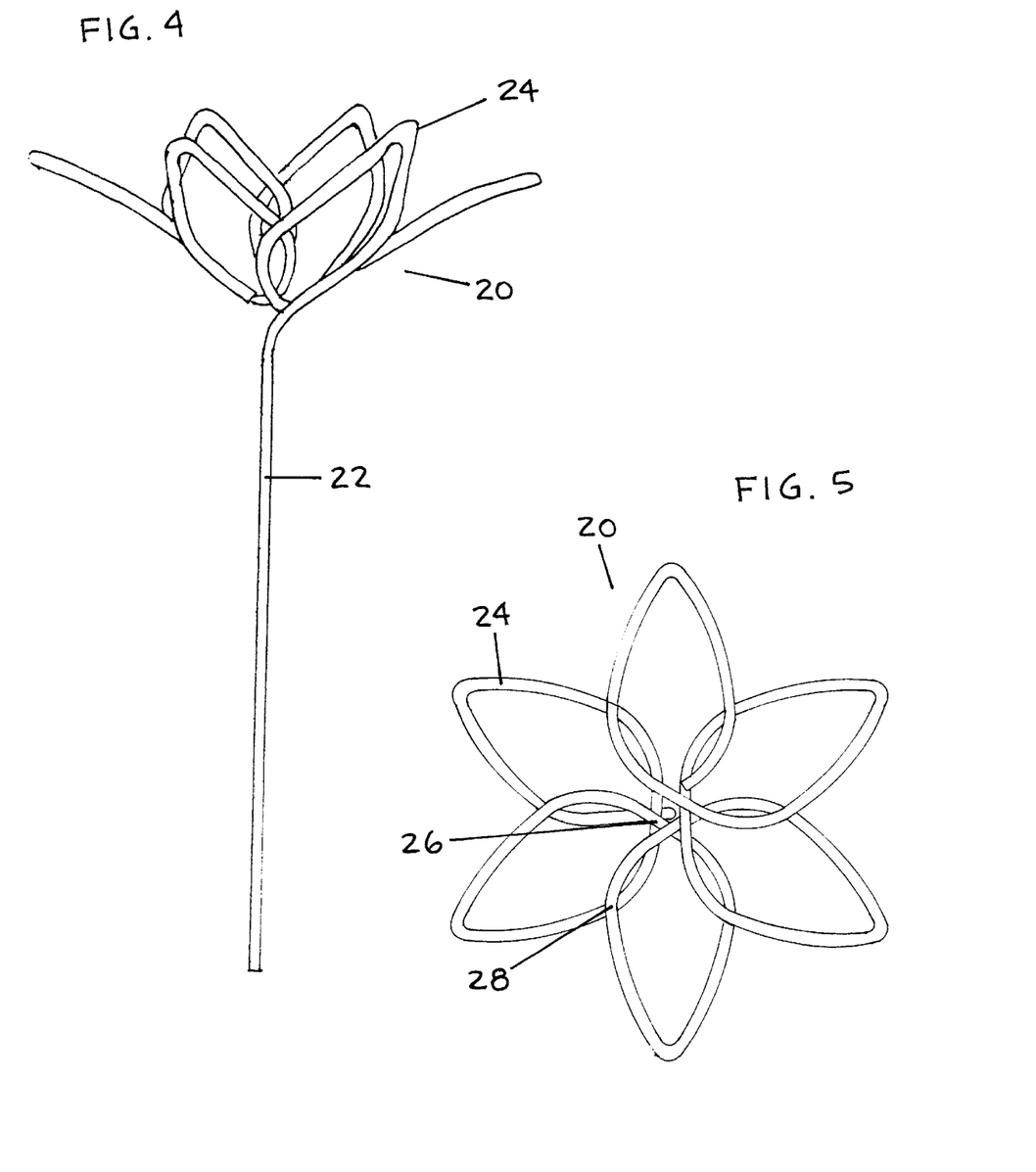
FIG. 4 is a perspective view of an alternate embodiment of a plant support showing the head formed in the shape of a lily.
FIG. 5 is a top view of the embodiment shown in FIG. 4.

Another embodiment of the plant support is shown in FIG. 4 (perspective view) and FIG. 5 (top view). This embodiment shows another configuration of the head 20, in which the loops 24 are formed so that overlaps 26 at the base of the loops occur near the center of the head 20. There are also overlaps 28 between adjoining loops. In the perspective view of FIG. 4, the loops 24 form a trumpet or funnel like shape. In use, this embodiment resembles the appearance of a lily where the shaft 22 resembles the flower stem, the head 20 resembles a flower head while the loops 24 resemble the shape and arrangement of flower petals.

Figure 6:
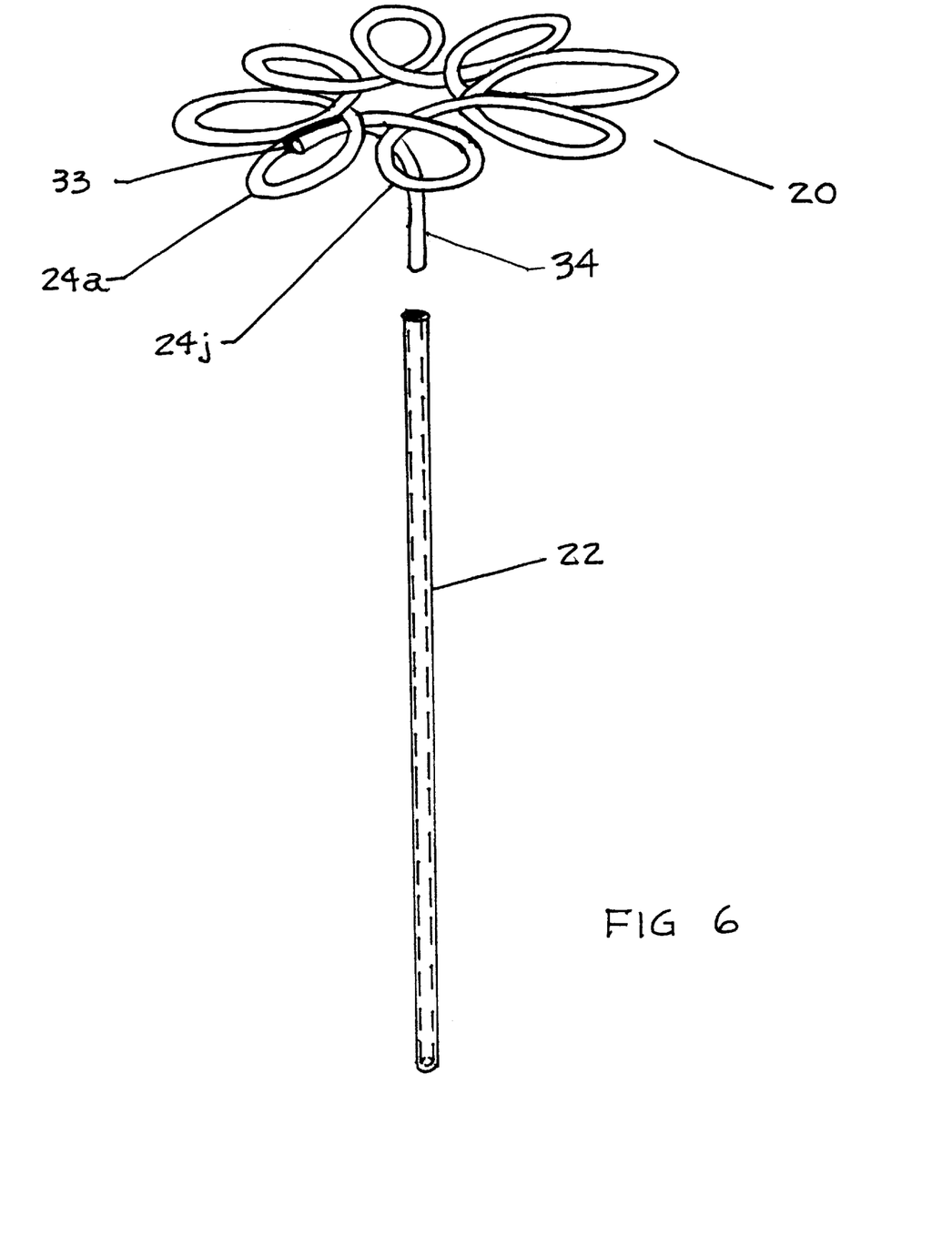
FIG. 6 is a exploded view of a plant support showing an alternate two piece construction.

Another embodiment of a plant support is shown in FIG. 6 (exploded view). This embodiment shows an alternate two piece construction where head 20 and shaft 22 are separate components. In this embodiment, head 20 is made from a single piece of wire. Shaft 22 is preferably a tube. The head includes a short extension 34 which can fit inside the shaft 22. The loose end of wire from loop 24j is preferably attached to a loop such as the first loop 24a. More preferably the end is attached to the loop by weld 33; however, the loose end could also be attached by solder, adhesive or other means known in the art. Head 20 and shaft 22 can be disassembled for more compact storage when not in use.

Figure 7:
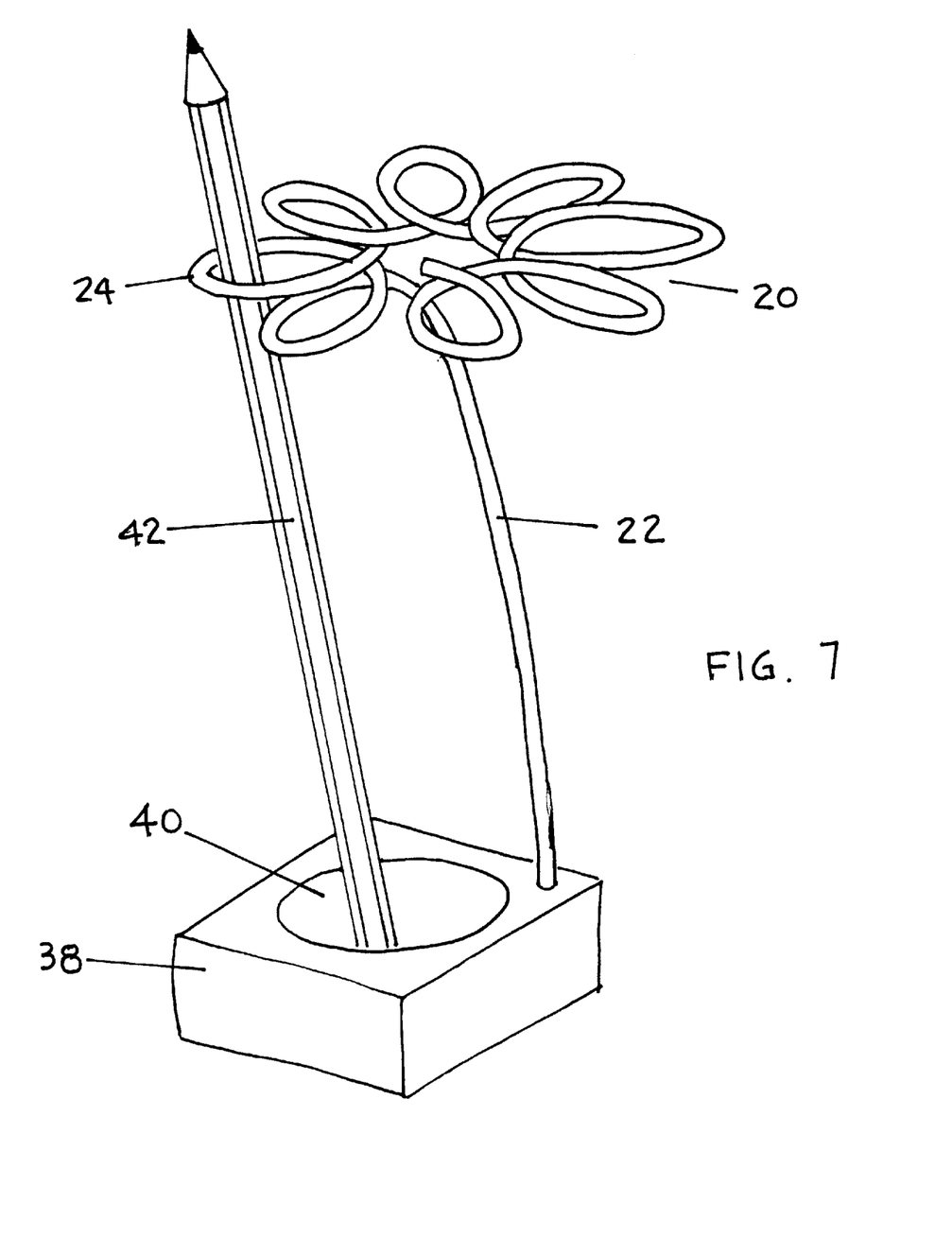
FIG. 7 is a perspective view of an embodiment for use in supporting writing implements which includes a base.

One embodiment of a support for writing implements is shown in FIG. 7. In addition to head 20 and shaft 22, this embodiment includes a base 38. Head 20 and shaft 22 are made from a single piece of wire. The lower end of shaft 22 is attached to base 38. The base 38 incorporates a cavity 40. In use, the lower end of a writing implement 42 is supported by the cavity 40 in the base 38. The upper end of the writing implement 42 is supported by one of the closed loops 24 of head 20.

Figure 8:
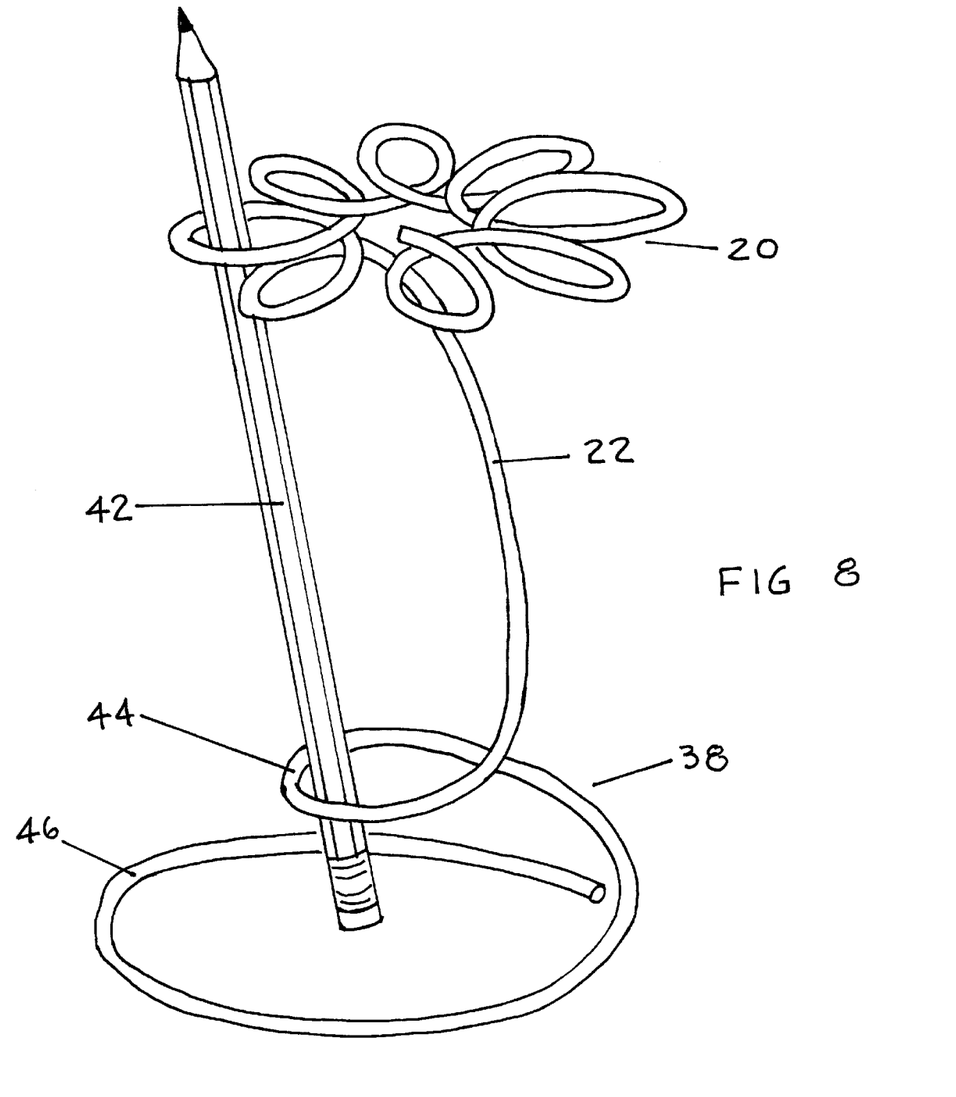
FIG. 8 is a perspective view of an alternate embodiment made of a single piece of wire for use in supporting writing implements.

Another embodiment of a support for writing implements is shown in FIG. 8. In this embodiment, head 20, shaft 22 and base 38 are formed from a single piece of wire. The wire base 38 consists of an upper smaller loop 44 and a lower larger loop 46. In use, the lower larger loop 46 forms the bottom of the device while the smaller upper loop 44 constrains the lower end of writing implement 42.

Figure 9:
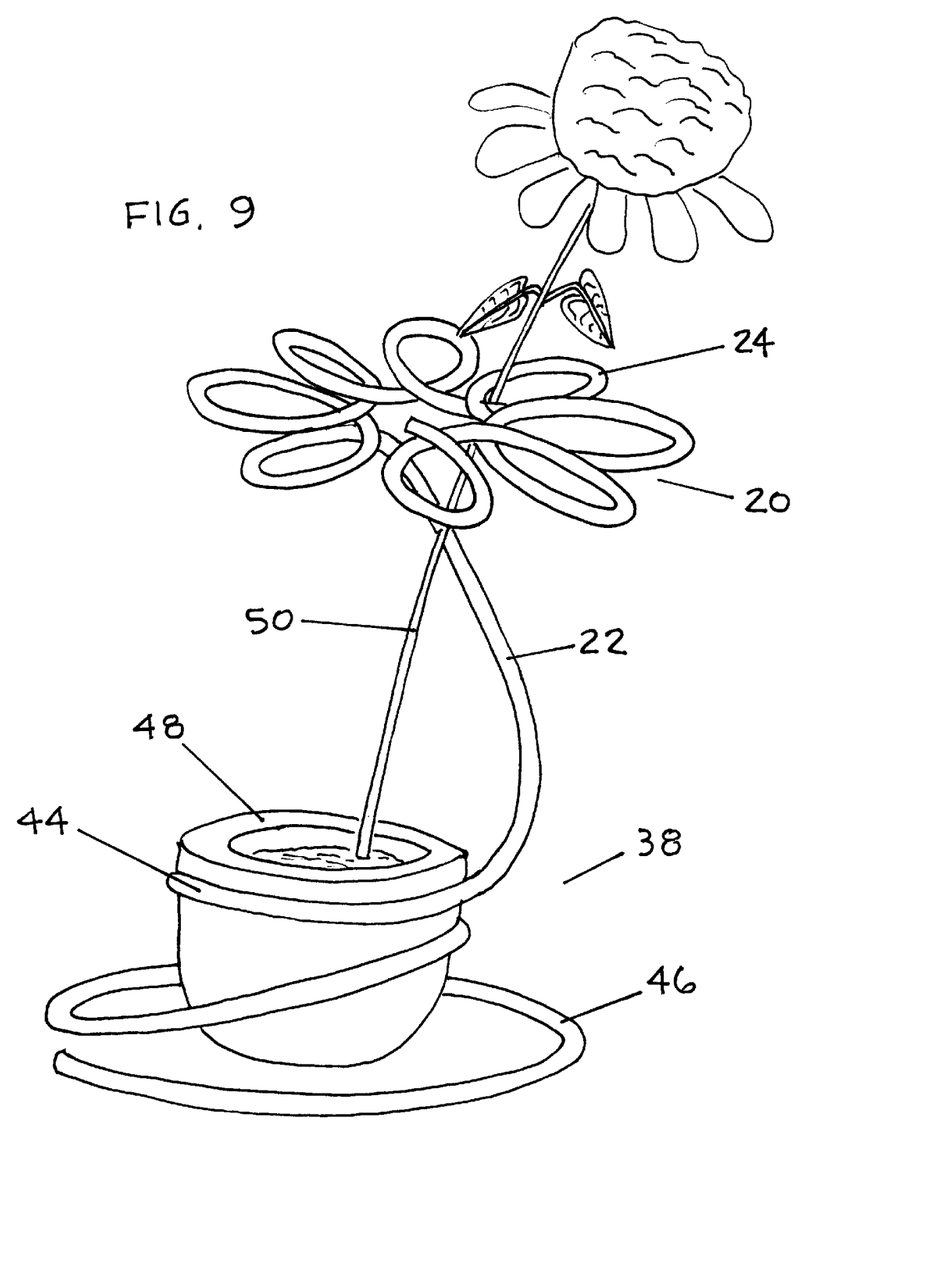
FIG. 9 is a perspective view of an embodiment for supporting cut flowers.

An embodiment of a support for cut flowers is shown in FIG. 9. This embodiment incorporates a container 48 which can hold a liquid such as water. Again, the head 20, shaft 22 and base 38 are formed from a single piece of wire. The wire base 38 consists of an upper smaller loop 44 and a lower larger loop 46. The upper smaller loop 44 supports container 48. In use, the lower larger loop 46 forms the bottom of the device. The lower end of a cut flower 50 rests in the container 48. The upper end of the cut flower 50 is supported by one of the closed loops 24 of head 20.

Figure 10:
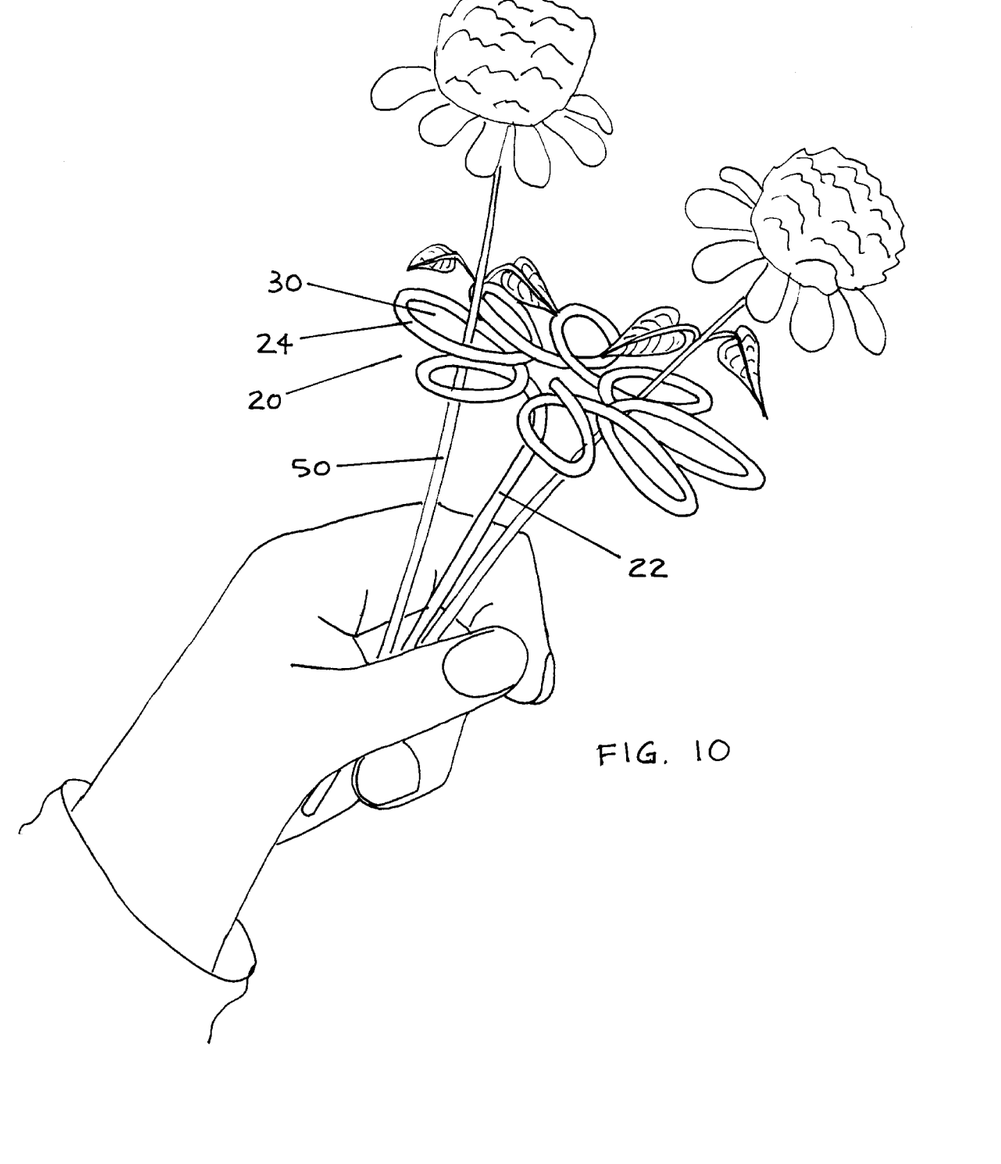
FIG. 10 is a perspective view of an embodiment for supporting a hand held bouquet of cut flowers.

An embodiment of a support for arranging a hand held bouquet of cut flowers is shown in FIG. 10. The support consists of head 20 and shaft 22 made from a single piece of wire. In use, the lower end of shaft 22 and cut flowers 50 are held in the hand. The upper end of cut flowers 50 are supported in openings 30 of loops 24.

The support of this invention provides support for multiple articles having elongated portions. Further, the invention provides for arranging the articles being supported by virtue of the fact that individual articles are surrounded and kept separate by the closed loops forming the head of the support. The number of components of the invention has been minimized by taking advantage of the surprising increase in rigidity afforded a wire formed to overlap in a series of loops. Finally, the invention resembles a flower and is ornamental as well as functional. As a result, it will be of more value to the user than a support which is merely functional.

While the above description contains many specifics, these should not be construed as limitations on the scope of the invention, but rather as examples of some preferred embodiments thereof. Many other variations are possible. For example, the plant supports in FIG. 1 through FIG. 6 could be used to support plants grown in pots as well as plants grown in the ground. The attachment of the loose end of the head depicted in the embodiment of FIG. 6 could be used in other embodiments. The embodiment of FIG. 7 could be used to support cut flowers and the embodiment of FIG. 8 could be used to support umbrellas if it were made larger. Although the head was shown in the form of a daisy and lily in the figures, it could be made in the form of any number of other flowers as for example a daffodil or a tulip. The base of FIG. 7 and the container of FIG. 9 could be made in any number of other configurations. The wire could be made from any suitable metal or plastic. The cross section of the wire could be circular, rectangular or any other shape available. Any number of finishes could be applied to the wire.

Accordingly, the scope of the invention should be determined not by the embodiments illustrated, but by the appended claims and their legal equivalents.

I claim:

1. A device for restraining one or more articles that have an elongated portion, including a single elongated shaft having at a first end a head substantially normal to the shaft and comprising a single wire bent in a substantially cycloidal fashion to form a series of closed loops surrounding a central opening for surrounding and thereby restraining the articles.

2. The device of claim 1 in which the shaft is constructed from tubing.

3. The device of claim 1 in which the head and the shaft are constructed from a single wire.

4. The device of claim 1 in which the loops are approximately elliptical in shape and extend outward from the shaft to simulate the petals of a flower.

5. The device of claim 1 in which an end of the wire forming the head is attached to a loop of the head.

6. The device of claim 5 in which the end of the wire is attached to the loop by a weld.

7. The device of claim 1 further comprising a base at a second end of the shaft, the base comprising means for further restraining the one or more articles.

8. The device of claim 7 in which the base is made from a single wire formed into at least one horizontal loop.

9. The device of claim 8 in which the shaft and the base are formed from a single wire.

10. The device of claim 8 in which the head, the shaft and the base are formed from a single wire.

11. The device of claim 7 in which the base comprises a means for holding a liquid.

12. The device of claim 1 further comprising a base at a second end of the shaft for holding a container for further restraining the articles and for holding a liquid.

13. The device of claim 1 in which the loops form a prolate cycloid.

14. The device of claim 1 in which the head comprises a wire bent into at least three loops.

* * * * *

UNITED STATES PATENT AND TRADEMARK OFFICE
CERTIFICATE OF CORRECTION

PATENT NO. : 6,389,744 B1
DATED : May 21, 2002
INVENTOR(S) : Pugh

It is certified that error appears in the above-identified patent and that said Letters Patent is hereby corrected as shown below:

<u>Title page,</u>
Item [*] Notice, delete "0" and insert -- 631 --.

Signed and Sealed this

Thirtieth Day of August, 2005

JON W. DUDAS
*Director of the United States Patent and Trademark Office*